United States Patent
Liu et al.

(10) Patent No.: US 12,545,978 B2
(45) Date of Patent: Feb. 10, 2026

(54) ALUMINUM ALLOY AND COMPONENT PART PREPARED THEREFROM

(71) Applicants: NIO TECHNOLOGY (ANHUI) CO., LTD., Hefei (CN); CSMET GROUP CO. LTD., Shanghai (CN)

(72) Inventors: Huachu Liu, Shanghai (CN); Chunmei Shi, Shanghai (CN); Zhenrong Duan, Hefei (CN); Shuo Li, Shanghai (CN); Gary Huges, Hefei (CN); Yanjun Du, Shanghai (CN); Fan Yang, Shanghai (CN); Shuai Cheng, Shanghai (CN); Wentao Fu, Shanghai (CN); Yuebo Zhang, Shanghai (CN)

(73) Assignees: NIO TECHNOLOGY (ANHUI) CO., LTD, Hefei (CN); CSMET GROUP CO., LTD., Shanghai (CN)

( * ) Notice: Subject to any disclaimer, the term of this patent is extended or adjusted under 35 U.S.C. 154(b) by 0 days.

(21) Appl. No.: 18/171,838

(22) Filed: Feb. 21, 2023

(65) Prior Publication Data
US 2023/0272509 A1 Aug. 31, 2023

(30) Foreign Application Priority Data
Feb. 25, 2022 (CN) .......................... 202210176143.2

(51) Int. Cl.
| | | |
|---|---|---|
| *C22C 21/02* | (2006.01) | |
| *B62D 29/00* | (2006.01) | |
| *C22F 1/043* | (2006.01) | |
| *C22C 21/00* | (2006.01) | |
| *C22C 21/04* | (2006.01) | |

(52) U.S. Cl.
CPC ............ *C22C 21/02* (2013.01); *B62D 29/008* (2013.01)

(58) Field of Classification Search
CPC .......................... C22C 21/02–04; C22F 1/043
See application file for complete search history.

(56) References Cited

U.S. PATENT DOCUMENTS

| | | |
|---|---|---|
| 2017/0107599 A1 | 4/2017 | Wang et al. |
| 2019/0169716 A1 | 6/2019 | Wang et al. |

FOREIGN PATENT DOCUMENTS

| | | | |
|---|---|---|---|
| EP | 1683881 | 7/2006 | |
| EP | 1975262 | * 12/2011 | .............. C22F 1/043 |
| EP | 3342889 | 7/2018 | |
| WO | WO 2019/034837 | 2/2019 | |

OTHER PUBLICATIONS

Extended Search Report for European Patent Application No. 23158579.5, dated Apr. 11, 2023, 7 pages.

* cited by examiner

*Primary Examiner* — Lois L Zheng

(74) *Attorney, Agent, or Firm* — Sheridan Ross P.C.

(57) ABSTRACT

The disclosure relates to an aluminum alloy and a component part prepared therefrom. The aluminum alloy comprises: 7-9 wt % of silicon (Si), 0.2-0.7 wt % of manganese (Mn), 0.09-0.4 wt % of iron (Fe), 0.1-0.3 wt % of vanadium (V), 0.1-0.2 wt % of titanium (Ti), 0.01-0.03 wt % of strontium (Sr), and the balance being aluminum and inevitable impurities, wherein the weight ratio of the manganese (Mn) to the iron (Fe) is not less than 1. The aluminum alloy of the disclosure can be exempt from heat treatment process after casting in the processing process, so as to contribute to energy conservation and emission reduction, and the component part prepared therefrom can achieve desired mechanical properties.

12 Claims, No Drawings

ALUMINUM ALLOY AND COMPONENT PART PREPARED THEREFROM

CROSS-REFERENCE TO RELATED APPLICATIONS

This application claims the benefit of China Patent Application No. 202210176143.2 filed Feb. 25, 2022, the entire contents of which are incorporated herein by reference in its entirety.

TECHNICAL FIELD

The disclosure belongs to the field of aluminum alloys. In particular, the disclosure relates to an aluminum alloy and a component part prepared therefrom.

BACKGROUND

Under the global trend of energy conservation and emission reduction, vehicle manufacturing and use is an important field of energy conservation and emission reduction. Replacing traditional fuel vehicles with electric vehicles has become a globally recognized solution for energy conservation and emission reduction.

As we all know, electric vehicles do not burn fossil fuels during use, nor do they produce tail gas emissions, which avoids the contribution of tail gas to the greenhouse effect. However, till now, the manufacturing process of electric vehicles still relies heavily on fossil fuels or the electric energy generated by them, which thereby generates more greenhouse gas emissions.

In order to improve the endurance mileage and safety performance of the electric vehicles, major vehicle manufacturers are increasingly using light alloys. Among them, aluminum alloys have become a preferred vehicle body material for mainstream electric vehicles due to their advantages of low density, high specific strength, good processability, abundant resources, etc. Aluminum alloy die-cast parts are often used in joint parts of the vehicle body due to their high production efficiency, excellent and stable performance, the ability to be designed and processed into complex shapes and the reduction in connection and assembly required by traditional parts.

Traditional processing techniques for die-cast aluminum alloy parts usually include high-pressure casting, trimming, heat treatment (solution+aging), shaping, surface treatment and final delivery.

With the development of the industry, heat-treatment-free aluminum alloys have become an industry trend. A heat treatment (solution+aging) process not only consumes a lot of energy and produces a lot of greenhouse gas emissions, but also leads to dimensional deformation of parts due to heating and cooling effects, which affects assembly accuracy and even leads to scrap.

At present, various aluminum alloy enterprises have developed some heat-treatment-free alloy formulae, such as Castasil-37 Al—Si series and Magsimal-59 Al—Mg series alloy formulae of Rheinmetall, EZ-cast 370 Al—Si series and A152 Al—Mg series of Alcoa, Al—Si series of Tesla Motors, etc.

In the art, it is also hoped to develop more aluminum alloys, which can be exempt from heat treatment after casting in the process of processing aluminum alloys into component parts, so as to contribute to energy conservation and emission reduction.

BRIEF SUMMARY

An object of the disclosure is to provide a high-pressure cast aluminum alloy, which can be exempt from heat treatment after casting in the process of processing the aluminum alloy into a component part, and the prepared component part has mechanical properties meeting corresponding requirements.

The object of the disclosure can be achieved by the following technical solutions.

A first aspect of the disclosure provides an aluminum alloy, comprising, relative to a total weight of the aluminum alloy: 7-9 wt % of silicon (Si), 0.2-0.7 wt % of manganese (Mn), 0.09-0.4 wt % of iron (Fe), 0.1-0.3 wt % of vanadium (V), 0.1-0.2 wt % of titanium (Ti), 0.01-0.03 wt % of strontium (Sr), and the balance being aluminum and inevitable impurities, wherein the weight ratio of the manganese (Mn) to the iron (Fe) is not less than 1.

A second aspect of the disclosure provides the use of the aluminum alloy in preparation of a component part.

A third aspect of the disclosure provides a component part, which is prepared from the aluminum alloy.

The aluminum alloy of the disclosure can be exempt from heat treatment process after casting in the processing process, so as to contribute to energy conservation and emission reduction, and the component part prepared therefrom can achieve desired mechanical properties.

DETAILED DESCRIPTION

Hereinafter, various aspects of the disclosure and further objects, features and advantages will be more fully embodied.

A first aspect of the disclosure provides an aluminum alloy, comprising, relative to a total weight of the aluminum alloy: 7-9 wt % of silicon (Si), 0.2-0.7 wt % of manganese (Mn), 0.09-0.4 wt % of iron (Fe), 0.1-0.3 wt % of vanadium (V), 0.1-0.2 wt % of titanium (Ti), 0.01-0.03 wt % of strontium (Sr), and the balance being aluminum and inevitable impurities, wherein the weight ratio of the manganese (Mn) to the iron (Fe) is not less than 1.

In the aluminum alloy of the disclosure, the silicon element, which is present in a content of 7-9 wt % relative to the total weight of the aluminum alloy, provides the fluidity for the aluminum alloy, ensures controllable shrinkage of the alloy in the solidification process, and reduces hot cracking tendency of a casting.

The silicon, which is present in a content of 7-9 wt % relative to the total weight of the aluminum alloy, not only ensures tensile strength of the alloy, but also ensures more than 85% by volume of an α-aluminum phase in the casting, thereby ensuring plasticity and toughness of the casting.

Preferably, relative to the total weight of the aluminum alloy, the content of the silicon is 7.2-8.6 wt %. More preferably, relative to the total weight of the aluminum alloy, the content of the silicon is 7.4-8.4 wt %, or the content of the silicon is 7.6 wt, 7.7 wt %, 7.8 wt %, 7.9 wt %, 8.1 wt %, 8.3 wt % or 8.4 wt %.

In the aluminum alloy of the disclosure, relative to the total weight of the aluminum alloy, the content of the manganese element is 0.2-0.7 wt %.

The manganese, which is present in a content of 0.2-0.7 wt % relative to the total weight of the aluminum alloy, increases the demoulding properties and strength of the casting.

Preferably, relative to the total weight of the aluminum alloy, the content of the manganese is 0.22-0.66 wt %. More preferably, relative to the total weight of the aluminum alloy, the content of the manganese is 0.23-0.64 wt %, or the content of the manganese is 0.23 wt %, 0.37 wt %, 0.40 wt %, 0.55 wt %, 0.63 wt % or 0.64 wt %.

In the aluminum alloy of the disclosure, relative to the total weight of the aluminum alloy, the content of the iron element is 0.09-0.4 wt %, and preferably, the content of the iron element is 0.09-0.32 wt %.

The inventors found that even when the iron content is as high as 0.4%, the aluminum alloy of the disclosure still maintains excellent mechanical properties. Therefore, in the preparation process of the aluminum alloy of the disclosure, there is no particularly strict requirement for the iron content in raw materials, so there is a wide choice of raw materials. Some wastes in the art may also be used as the raw materials of the aluminum alloy of the disclosure.

In the aluminum alloy of the disclosure, relative to the total weight of the aluminum alloy, the content of the vanadium element is 0.1-0.3 wt %.

The vanadium (V), which is present in a content of 0.10-0.3 wt % relative to the total weight of the aluminum alloy, can form an Al—V intermetallic compound with Al, thereby providing the functions of grain refinement and dispersion strengthening, and improving the strength. In addition, the addition of the V element also improves corrosion resistance of the aluminum alloy.

Preferably, relative to the total weight of the aluminum alloy, the content of the vanadium is 0.11-27 wt %. More preferably, relative to the total weight of the aluminum alloy, the content of the vanadium is 0.12-0.25 wt %, or the content of the vanadium is 0.13 wt %, 0.16 wt %, 0.17 wt %, 0.19 wt % or 0.21 wt %.

In the aluminum alloy of the disclosure, relative to the total weight of the aluminum alloy, the content of the titanium element is 0.1-0.2 wt %.

The titanium, which is present in a content of 0.1-0.2 wt % relative to the total weight of the aluminum alloy, serves to refine the grain size of the α-Al phase.

Preferably, relative to the total weight of the aluminum alloy, the content of the titanium is 0.11-0.18 wt %. More preferably, relative to the total weight of the aluminum alloy, the content of the titanium is 0.12-0.17 wt %, or the content of the titanium is 0.14 wt %, 0.15 wt % or 0.17 wt %.

In the aluminum alloy of the disclosure, relative to the total weight of the aluminum alloy, the content of the strontium element is 0.01-0.03 wt %.

The strontium, which is present in a content of 0.01-0.03 wt % relative to the total weight of the aluminum alloy, can modify an acicular eutectic silicon phase into fibrous morphology (modification treatment), thereby improving the mechanical properties of the casting.

Preferably, relative to the total weight of the aluminum alloy, the content of the strontium is 0.015-0.02 wt %.

In some embodiments, an Mn content/V content ratio Z is less than 2.9.

In some embodiments, the Mn content/V content ratio Z satisfies $2.9 \leq Z < 4.5$.

In some embodiments, the Mn content/V content ratio Z is greater than 4.5.

The aluminum alloy of the disclosure has simple ingredients, and good economy and castability.

For example, the aluminum alloy of the disclosure may be prepared according to the following steps:

Material preparation: Materials are prepared according to proportions of alloy ingredients. Alloying elements are added in the form of pure alloys or intermediate alloys. For example, the Si element is added in the form of elemental silicon, the Mn element is added in the form of an Al—Mn intermediate alloy, the Fe element is added in the form of an Al—Fe intermediate alloy (when recycled aluminum is used for blending, according to the actual control within the maximum range of 0.4, there is no need to add iron-related alloys), the Ti element is added in the form of an Al—Ti intermediate alloy, the V element is added in the form of an Al—V intermediate alloy, and the Sr element is added in the form of an Al—Sr intermediate alloy.

Melting of aluminum ingot: After the surface of a pure aluminum ingot is cleaned, the pure aluminum ingot and silicon are placed in an electric resistance crucible for heating and melting. The temperature of the molten aluminum is controlled at 720-740° C.

Addition of intermediate alloy: When the temperature of the molten aluminum reaches 730-735° C., the Al—Mn intermediate alloy, the Al—V intermediate alloy, the Al—Ti intermediate alloy and the other intermediate alloys that are dried are added to the molten aluminum. The temperature of the molten aluminum is increased to 740-760° C. and kept for 10-30 min to ensure that all the intermediate alloys added are melted.

Refining, modification and degassing: The Al—Sr intermediate alloy is pressed into the molten aluminum first, and then the molten aluminum is degassed in order to remove hydrogen in the molten aluminum. Parameters are controlled as follows: the rotate speed of a degasser is 150-300 rpm, the gas introduced is high-purity argon or nitrogen with a purity of greater than 99.99%, and the flow rate of the gas is 0.3-0.8 L/min.

Ingredient detection and cooling: After the refining and the degassing are completed, scum on the surface of the molten aluminum is scraped off, the molten aluminum is allowed to stand for 15-25 min, and a spectral sample piece is taken to detect its ingredients. The molten aluminum is cooled after the ingredients meet the requirements.

The aluminum alloy of the disclosure may be cast by conventional methods in the art, for example, it may be cast under high pressure.

Specifically, the aluminum alloy of the disclosure may be cast according to the following die-casting process:

The temperature of a die-casting molten aluminum is controlled at 680-700° C., the temperature of a mold temperature controller is controlled at 150-170° C., the speed at a high speed is controlled at 1.65-1.85 m/s, and the boost pressure is 65 Mpa. In the case of processing the aluminum alloy into a specific component part, trimming, dimensional inspection and optional proper shaping are further carried out after casting.

In addition, since the alloy formula of the disclosure can absorb up to 0.4 wt % of the iron (Fe) element, it is possible to use recycled wastes when melting the alloy ingredients, which contributes to energy conservation and emission reduction.

The aluminum alloy of the disclosure has good mechanical properties in the as-cast state. It is an advantage of the aluminum alloy formula of the disclosure that the mechanical properties required by the design can be achieved by eliminating the heat treatment process after the casting, which can realize energy conservation and emission reduction.

The inventors found that when the Mn content/V content ratio Z is less than 2.9, the aluminum alloy of the disclosure has a tensile strength (UTS) of greater than 255 MPa, a yield strength (YS) of greater than 110 MPa and an elongation at break (EL) of greater than 12%; when the Mn content/V content ratio Z satisfies $2.9 \leq Z < 4.5$, the aluminum alloy of the disclosure has a tensile strength (UTS) of greater than 260 MPa, a yield strength (YS) of greater than 120 MPa and an elongation at break (EL) of greater than 10%; and when the Mn content/V content ratio Z is greater than 4.5, the aluminum alloy of the disclosure has a tensile strength (UTS) of greater than 270 MPa, a yield strength (YS) of greater than 120 MPa and an elongation at break (EL) of greater than 7% and less than 10%.

The excellent strength and elongation of the aluminum alloy of the disclosure ensure the light weight and safety of the prepared component part.

A second aspect of the disclosure provides the use of the aluminum alloy in preparation of a component part.

The aluminum alloy of the disclosure can be used in the preparation of a component part, and the prepared component part can meet certain mechanical requirements.

For example, the aluminum alloy of the disclosure can be used in the preparation of a vehicle body, a chassis and other load-bearing parts.

A third aspect of the disclosure provides a component part, which is prepared from the aluminum alloy.

The component part prepared from the aluminum alloy of the disclosure has excellent mechanical properties, and can be used as a vehicle body, a chassis and other load-bearing parts.

Therefore, the component part is selected from a vehicle body, a chassis and other load-bearing parts.

In this application, the terms "include" and "comprise" cover the case where other elements not explicitly mentioned are also included or comprised, and the case composed of the mentioned elements.

Unless otherwise defined, all technical and scientific terms used herein have the same meaning as commonly understood by those skilled in the art to which the disclosure belongs. When the definitions of terms in the description conflict with the meaning generally understood by those skilled in the art to which the disclosure belongs, the definition described herein shall prevail.

Unless otherwise stated, all values used in the description and claims to express the amount, temperature, etc. of ingredients are understood to be modified by the term "about". Therefore, unless indicated to the contrary, the numerical parameters described herein are approximate values that can vary according to the desired performance that needs to be achieved.

EXAMPLES

The concept, specific structure and the generated technical effects of the disclosure will be further described below with reference to examples and accompanying drawing, such that those skilled in the art can fully understand the purposes, features and effects of the disclosure. It will be readily understood by those skilled in the art that the examples herein are only for exemplary purposes, and the scope of the disclosure is not limited thereto. Unless explicitly stated, the raw materials used in the examples are those commonly used in the art.

Example 1

This example provides an aluminum alloy, comprising the following ingredients in percentage by weight: Si: 7.9%, Mn: 0.63%, Fe: 0.09%, V: 0.13%, Ti: 0.15%, Sr: 0.02%; and the balance being aluminum and inevitable impurities.

The preparation process of the aluminum alloy is as follows:

1) Material preparation and furnace cleaning. Materials are prepared according to proportions of alloy ingredients. After the material preparation is completed, the furnace needed to be cleaned. Alloying elements are added in the form of pure alloys or intermediate alloys. The Si element is added in the form of elemental silicon 3303, the Mn element is added in the form of an Al—Mn intermediate alloy, the Fe element is added in the form of an Al—Fe intermediate alloy, the Ti element is added in the form of an Al—Ti intermediate alloy, the V element is added in the form of an Al—V intermediate alloy, and the Sr element is added in the form of an Al—Sr intermediate alloy.

2) Melting of aluminum ingot: After the surface of a pure aluminum ingot is cleaned, the pure aluminum ingot and the silicon 3303 are placed in an electric resistance crucible for heating and melting. The temperature of an molten aluminum is controlled at 720-740° C.

3) Addition of intermediate alloy: When the temperature of the molten aluminum reaches 730° C., the Al—Mn intermediate alloy, the Al—V intermediate alloy, the Al—Ti intermediate alloy and the other intermediate alloys that are dried are added to the molten aluminum. The temperature of the molten aluminum is increased to 740° C. and kept for 15 min to ensure that all the intermediate alloys added are melted.

4) Refining, modification and degassing: The Al—Sr intermediate alloy is pressed into the molten aluminum first, and then the molten aluminum is degassed by a degasser with a graphite rotor in order to remove hydrogen in the molten aluminum. Parameters are controlled as follows: the rotate speed of a degasser is 150-300 rpm, the gas introduced is high-purity argon or nitrogen with a purity of greater than 99.99%, and the flow rate of the gas is 0.3-0.8 L/min.

5) Ingredient detection and cooling: After the refining and the degassing are completed, scum on the surface of the molten aluminum is scraped off, the molten aluminum is allowed to stand for 15-25 min, and a spectral sample piece is taken to detect its ingredients. The molten aluminum is cooled to 680-700° C. after the ingredients meet the requirements.

The prepared aluminum alloy is cast into an aluminum alloy sample according to the following casting process: the temperature of a mold temperature controller is controlled at 150-170° C., the speed at a high speed is controlled at 1.65-1.85 m/s, and the boost pressure is 65 Mpa.

The mechanical properties of the prepared aluminum alloy sample are tested according to GB/T228.1. The results are shown in Table 1.

Examples 2 to 7

A series of aluminum alloys are prepared by a process basically the same as in Example 1. The specific ingredients and contents are shown in Table 1 (the balance is aluminum and inevitable impurities, not shown). The prepared aluminum alloy samples are tested for their mechanical properties. The results are shown in Table 1.

TABLE 1

| Examples | Si | Mn | Fe | V | Ti | Sr | Z value | Tensile strength (MPa) | Yield strength (MPa) | Elongation (%) |
|---|---|---|---|---|---|---|---|---|---|---|
| 1 | 7.9 | 0.63 | 0.09 | 0.13 | 0.15 | 0.02 | 4.85 | 267.3 | 123.3 | 9.5 |
| 2 | 7.8 | 0.64 | 0.09 | 0.21 | 0.14 | 0.02 | 3.05 | 267.9 | 122.7 | 12.8 |
| 3 | 8.4 | 0.55 | 0.09 | 0.19 | 0.15 | 0.02 | 2.89 | 272.6 | 124.3 | 15 |
| 4 | 7.7 | 0.40 | 0.09 | 0.17 | 0.15 | 0.02 | 2.35 | 260.1 | 110.9 | 15.7 |
| 5 | 7.6 | 0.23 | 0.09 | 0.19 | 0.15 | 0.02 | 1.21 | 258.7 | 112.3 | 13.7 |
| 6 | 8.3 | 0.37 | 0.32 | 0.16 | 0.17 | 0.02 | 2.31 | 268.3 | 121.7 | 15.2 |
| 7 | 8.1 | 0.37 | 0.31 | 0.19 | 0.15 | 0.02 | 1.95 | 270.4 | 125.1 | 14.2 |

As can be seen from Table 1, the aluminum alloy of the disclosure after casting can have a tensile strength of more than 255 MPa, a yield strength of more than 110 MPa and an elongation of more than 9%.

Comparative Examples 1 to 5

A series of aluminum alloys are prepared by a process basically the same as in Example 1. The specific ingredients and contents are shown in Table 2 (the balance is aluminum and inevitable impurities, not shown). The prepared aluminum alloy samples are tested for their mechanical properties. The results are shown in Table 2.

TABLE 2

| Comparative Example | Si | Mn | Fe | V | Ti | Sr | Tensile strength (MPa) | Yield strength (MPa) | Elongation (%) |
|---|---|---|---|---|---|---|---|---|---|
| 1 | 9.80 | 0.57 | 0.11 | 0.098 | 0.14 | 0.019 | 272.4 | 137.3 | 6.1 |
| 2 | 9.21 | 0.73 | 0.10 | 0.18 | 0.13 | 0.016 | 277.5 | 139.1 | 7.9 |
| 3 | 9.06 | 0.70 | 0.34 | 0.13 | 0.15 | 0.026 | 254.4 | 132.6 | 6.1 |
| 4 | 8.58 | 0.72 | 0.35 | 0.096 | 0.14 | 0.019 | 253.8 | 130.1 | 6.8 |
| 5 | 8.97 | 0.71 | 0.35 | 0.129 | 0.15 | 0.023 | 245.1 | 130.4 | 5.4 |

As can be seen from Table 2, the aluminum alloys in Comparative Examples 1 to 5 after casting can have a tensile strength of more than 245 MPa and a yield strength of more than 130 MPa, but the elongation is lower than 8%.

Only the exemplary embodiments or examples of the disclosure have been described above, and they are not intended to limit the disclosure. For those skilled in the art, various modifications and changes can be made on the disclosure. Any modifications, equivalent replacements, and improvements, etc., made within the spirit and principle of the disclosure, shall fall within the scope of the claims of this application.

What is claimed is:

1. An aluminum alloy, consisting of, relative to a total weight of the aluminum alloy: 7-9 wt % of silicon (Si), 0.2-0.7 wt % of manganese (Mn), 0.09-0.4 wt % of iron (Fe), 0.1-0.3 wt % of vanadium (V), 0.1-0.2 wt % of titanium (Ti), 0.01-0.03 wt % of strontium (Sr), and the balance being aluminum and inevitable impurities, wherein a weight ratio of the manganese (Mn) to the iron (Fe) is not less than 1, and wherein the aluminum alloy without any heat treatment after casting has a tensile strength of more than 255 MPa, a yield strength of more than 110 MPa, and an elongation of more than 9%.

2. The aluminum alloy according to claim 1, wherein relative to the total weight of the aluminum alloy, a content of the silicon is 7.2-8.6 wt %.

3. The aluminum alloy according to claim 1, wherein relative to the total weight of the aluminum alloy, a content of the manganese is 0.22-0.66 wt %.

4. The aluminum alloy according to claim 1, wherein relative to the total weight of the aluminum alloy, a content of the iron is 0.09-0.32 wt %.

5. The aluminum alloy according to claim 1, wherein relative to the total weight of the aluminum alloy, a content of the vanadium is 0.11-0.27 wt %.

6. The aluminum alloy according to claim 1, wherein relative to the total weight of the aluminum alloy, a content of the titanium is 0.11-0.18 wt %.

7. The aluminum alloy according to claim 1, wherein relative to the total weight of the aluminum alloy, a content of the strontium is 0.015-0.02 wt %.

8. The aluminum alloy according to claim 1, wherein an Mn content/V content ratio Z is less than 2.9.

9. The aluminum alloy according to claim 1, wherein a Mn content/V content ratio Z satisfies $2.9 \leq Z < 4.5$.

10. The aluminum alloy according to claim 1, wherein a Mn content/V content ratio Z is greater than 4.5.

11. A component part, which is prepared from the aluminum alloy according to claim 1.

12. The component part according to claim 11, wherein the component part is selected from a vehicle body, a chassis and other load-bearing parts.

* * * * *